June 6, 1961 W. A. MALTHANER 2,987,677

CATHODE FOLLOWER TUBE CIRCUIT

Filed Nov. 28, 1952

INVENTOR
W. A. MALTHANER
BY James W. Falk
ATTORNEY 2,987,677

CATHODE FOLLOWER TUBE CIRCUIT

William A. Malthaner, New Providence, N.J., assignor to Bell Telephone Laboratories, Incorporated, New York, N.Y., a corporation of New York Filed Nov. 28, 1952, Ser. No. 322,991
3 Claims. (Cl. 330—70)

This invention relates to electrical circuits and more particularly to such circuits employing cathode follower tubes.

It is known in the art that a cathode follower tube may be used between a source of voltage pulses and a load to supply the load with pulses of the desired voltage, sufficient power, and sufficiently low impedance. If negative pulses are to be supplied and the pulses are short and very steep the parasitic capacitance to ground along the output lead from the cathode of the cathode follower tube to the load circuits will tend to prevent the output pulses from similarly having sharply defined characteristics. This is because this parasitic capacitance must discharge through the resistance of the load circuits in accordance with the time constant of the *r–c* circuit determined by the leakage capacitance and the load resistances. Thus, when a sharply falling negative pulse is applied to the grid of the cathode follower tube a slowly decreasing pulse will be transmitted along the output lead.

This large time constant can be reduced by placing a dummy load or resistor of low resistance between the cathode of the tube and ground. However, the normal voltage level of the output lead is determined by the current flowing through the tube and through the resistances between the cathode of the tube and ground. If a dummy load or low resistor is placed in parallel with the load resistance, then, to maintain the desired voltage level on the output lead and also to supply the desired power to the load, a higher current must flow through the tube considerably increasing the power requirements of the tube and the tube size.

It is an object of this invention to increase the rapidity of the response of a cathode follower tube on application to the grid of the tube of a sharp negative pulse. Thus it is an object of this invention that the output pulses rapidly attain their steady state low negative value in response to the applied pulses.

It is another object of this invention to provide a short time constant for the distributed parasitic capacitance of the output lead without increasing the power dissipation requirements of the cathode follower tube.

It is a further object of this invention to attain the above objects in a circuit in which the parameters are not critical so that substantial variations in the values of the various circuit elements may be tolerated without impairing the operation of the circuit.

These and other objects of this invention are attained in accordance with one specific embodiment wherein an additional tube is placed between the cathode of the cathode follower tube and ground and thus in parallel with the load resistance. The control electrode of this tube is biased to cut-off and connected through a capacitor to the plate of the cathode follower tube. In this manner, the two tubes are not direct current coupled and the second tube is normally not conducting. A resistance is also provided between the plate of the cathode follower tube and the positive voltage supply therefor. When a sharply decreasing negative pulse is applied to the grid of the cathode follower tube its voltage will drop and the voltage of the output lead connected to the cathode will also tend to drop but will be prevented from following the applied pulse due to the charge on the parasitic capacitance between the output lead and ground. As the drop in the cathode voltage lags the almost instantaneous drop in the grid voltage, a sufficient potential difference will exist between them to inhibit conduction through the tube. When this occurs current flowing through the tube will substantially decrease if not momentarily cease and the voltage of the plate will tend to assume the value of the positive voltage bias applied to the plate resistor thereby causing a positive voltage error signal to be applied to the control electrode of the discharging tube. This will cause the other or error signal tube to conduct and provide a low resistance discharge path through the tube in parallel with the load resistance thus considerably decreasing the time constant of the R—C circuit and enabling the charge on the parasitic capacitance to be rapidly discharged to ground.

It is therefore a feature of this invention that a normally non-conducting discharge device be positioned in parallel with the load resistance of a cathode follower tube and be rendered to its conducting state only on application thereto of an error signal pulse from the plate of the cathode follower tube.

It is a further feature of this invention that this error signal tube be a triode biased at cut-off and that a plate resistor be connected between the plate of the cathode follower tube and the positive voltage source therefor to supply a positive error signal pulse to cause conduction in the error signal tube when conduction substantially decreases or ceases in the cathode follower tube. This decrease or cessation is due to the delay in response of the cathode output lead caused by the parasitic capacitance thereof.

A complete understanding of these and other various features of this invention may be gained from a consideration of the following detailed description and the accompanying drawing, in which.

Figure 1:
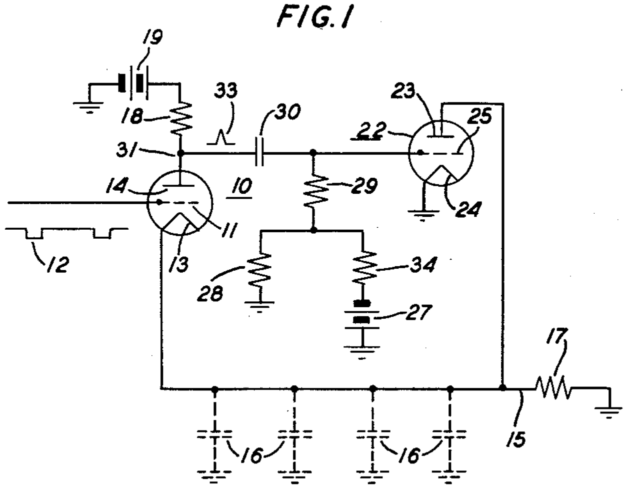
FIG. 1 is a schematic representation of one specific embodiment of a cathode follower circuit in accordance with this invention.
Figure 3:
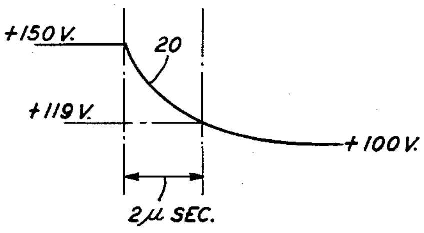
Figure 4:
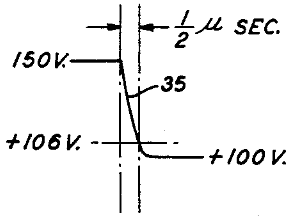

FIG. 3 portrays the output pulse applied to the load resistance by cathode follower circuits of the prior art; and FIG. 4 represents the output pulse of the circuit of FIG. 1.

Referring now to the drawing, the specific illustrative embodiment of this invention depicted in FIG. 1 comprises a cathode follower tube 10 having a control electrode 11 to which are applied sharply defined negative pulses 12, a cathode 13 and an anode 14. Connected to the cathode 13 by a lead 15 are a plurality of load circuits having an equivalent resistance 17 which can be defined as the load resistance of the cathode follower tube. Distributed along the lead 15 is the parasitic capacitance which may be represented by a plurality of discrete capacitance elements 16. A positive voltage is applied in accordance with this invention to the anode 14 of the cathode follower tube from some positive voltage source 19 through a plate resistor 18.

Figure 2:
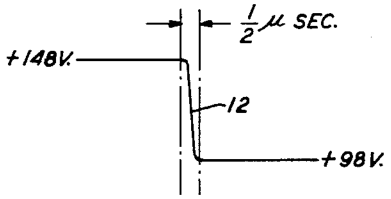
FIG. 2 depicts the input pulse applied to the control electrode of a cathode follower tube.

Turning now to FIG 2. The input pulse in one specific circuit in accordance with this invention was a negative going pulse 12 decreasing from +148 volts to +98 volts in substantially a half a microsecond. When this pulse is applied to the control electrode 11 of a cathode follower tube circuit in accordance with the prior art, the voltage on the cathode will tend to decrease from its initial value of about +150 volts to a steady state value of about +100 volts as shown by the output pulse 20 of FIG. 3. The delay in this decrease can be appreciated by considering actual resistance and capacitance values for circuits of this type. I have found that the parasitic capacitance 17 may be of the order of 200 micromicrofarads. If the load resistance is determined by ten gate circuits each comprising a number of varistors and a hundred thousand ohm resistance the equivalent resistance 17 will be 10,000 ohms. It is therefore apparent that the time constant of the R-C circuit defined by the parasitic capacitance and the load resistance will be two microseconds. This means that the output pulse 20 will have decreased to two-thirds of its final drop or to about 119 volts in two microseconds. It is readily apparent that this incomplete drop has consumed four times the time required for the input pulse.

In many circuits in which rapidity of action and response is essential this long delay is prohibitive. We can consider as an exemplary requirement that the voltage of the output lead, that is, that the output pulse should drop about eight-ninths of its total voltage change within the same one-half microsecond that it required the input pulse to decrease to its final voltage drop. This can be readily attained in accordance with my invention. Referring now again to FIG. 1, a second or error signal tube 22 has its anode 23 connected to the output lead 15 and its cathode 24 to ground. The control electrode 25 of this tube 22 is biased to cut-off by a negative voltage source 27 and resistances 28, 29 and 34 as is known in the art. The grid 25 is connected through a capacitance 30 to the point 31 of the connection between the anode 14 and the plate resistor 18 of the cathode follower tube 10. The anode 23 of tube 22 is connected directly to the output lead 15 and has the potential of the cathode 13 applied thereto. In the one specific circuit in accordance with this invention discussed above, this potential decreases from a normal value of about +150 volts to about +100 volts when a negative input pulse is applied to the control electrode 11 of the cathode follower tube 10. As the voltage of the cathode 13 and the output lead 15 drops more slowly than the voltage on the control grid 11 which is determined by the input pulse 12, the potential of the cathode 13 will become sufficiently positive to cause the current in the cathode follower tube to substantially decrease or to cease. When this occurs the voltage of the point 31 of connection between the plate 14 and the plate resistance 18 will momentarily rise from a value determined by the voltage source 19 and the drop through the resistor 18 to that of the voltage source 19 alone causing a positive voltage error signal pulse 33 to be applied through the capacitor 30 to the control electrode 25. This in turn will cause the tube 22 to conduct applying a low resistance path in parallel with the parasitic capacitance 16 and the load resistance 17.

In my exemplary embodiment discussed above, it was desirous to have the output pulse on lead 15 drop to within one-ninth of its final value within the same time that the input pulse drops to its final value, which in the illustrative embodiment under discussion was one-half a microsecond. It is therefore apparent that the time constant required for the dissipation of charge on the parasitic capacitance 16 is .2 microsecond which in turn necessitates that the apparent resistance in parallel with the parasitic capacitance 16 be of approximately 1,000 ohms. The tube 22 is therefore chosen to have this desired resistance when conducting. The output pulse 35 attained in the specific embodiment of this invention depicted is shown in FIG. 4.

In one specific embodiment of this invention wherein the cathode follower tube 10 and the tube 22 were two elements of a Tungsol double element triode 5687, the voltage source 19 was 300 volts and was chosen such as to maintain the proper steady state voltage of 150 volts on output lead 16. The plate resistance 18 was 1,000 ohms, resistance 28 was 7,500 ohms, resistance 34 was 0.15 megohm, resistance 29, 0.1 megohm, the negative source 27 was −150 volts and the capacitor 30 was 75 micromicrofarads. However, it should be emphasized that the relationships between the various parameters are not critical as the operation of circuits in accordance with the invention is not dependent on maintaining precise balaces between the various elements. Thus, voltage supply 19 need only be large enough to provide the desired voltage level on output lead 15, the bias supplied to the control electrode 25 need only be below the cut-off voltage for tube 22, and the resistor 18 need only be large enough so that the error signal 33 is sufficient to raise the voltage on the control electrode 25 above cut-off. Circuits in accordance with this invention do not present serious maintenance problems as slight variations of the characteristics of the various tubes, resistors, and voltage supplies due to aging of these elements or for other reasons will not impair the operation of the circuit.

It is to be understood that the above-described arrangements are illustrative of the application of the principles of the invention. Numerous other arrangements may be devised by those skilled in the art without departing from the spirit and scope of the invention.

What is claimed is:

1. In a control circuit for supplying voltage signals to a load including capacitance, a cathode follower tube having a cathode, control electrode and a plate, a normally non-conducting error signal tube having a control electrode, a cathode and an anode, means connecting the anode-cathode paths of said cathode follower and error signal tubes in series across a potential source, means coupling said load directly between the cathodes of said tubes through connections devoid of potential sources and devoid of concentrated impedance, means for applying a voltage signal to the control electrode of said cathode follower tube, and means coupling the anode of said cathode follower tube to the control electrode of said error signal tube, the negative-going portion of the applied voltage signal rendering said cathode follower tube non-conductive and said error signal tube conductive, whereby the discharging current of said load capacitance flows through only said error signal tube.

2. A control circuit for supplying negative voltage pulses into a load including capacitance while retaining the shape of the leading edge of said pulses comprising a cathode follower tube and a normally non-conducting error signal tube, each of said tubes including an anode, a cathode and a control electrode, means connecting the anode of said cathode follower tube through a resistor to one terminal of a potential source, means connecting the cathode of said cathode follower tube to the anode of said error signal tube, means connecting the cathode of said error signal tube to the other terminal of said potential source, a coupling between the cathode of said cathode follower tube and one terminal of said load capacitance, a coupling devoid of potential sources and devoid of concentrated impedance between the cathode of said error signal tube and the other terminal of said capacitance, means for applying the voltage drop across said resistor to the control electrode of said error signal tube, and means for applying aperiodic single negative-going pulse signals to the control electrode of said cathode follower tube, the negative-going portion of said pulse signals being sufficient to cut off said cathode follower tube, whereby the error signal tube is rendered conductive and the discharging current of said load capacitance flows through only said error signal tube.

3. A circuit for supplying negative voltage control pulses into a load including capacitance while retaining the shape of the leading edge of said pulses comprising a cathode follower tube and an error signal tube, each including an anode, a cathode and a control electrode, means connecting the anode-cathode paths of said tubes in series across a single potential source, means coupling the load directly between the cathodes of said tubes through connections devoid of potential sources and devoid of concentrated impedance, means for applying distinct aperiodic sharply decreasing negative voltage signal pulses to the control electrode of said cathode follower tube, and means coupling the anode of said cathode follower tube to the control electrode of said error signal tube, the cathode follower tube being cut off by the input signal, whereby the discharging current of said load capacitance flows through said error signal tube.

References Cited in the file of this patent

UNITED STATES PATENTS

| | | |
|---|---|---|
| 2,358,428 | White | Sept. 19, 1944 |
| 2,428,295 | Scantlebury | Sept. 30, 1947 |
| 2,579,633 | Wadzinski | Dec. 25, 1951 |
| 2,597,630 | French | May 20, 1952 |
| 2,662,938 | Goldstine | Dec. 15, 1953 |
| 2,679,029 | Jose | May 18, 1954 |